United States Patent Office 3,707,444
Patented Dec. 26, 1972

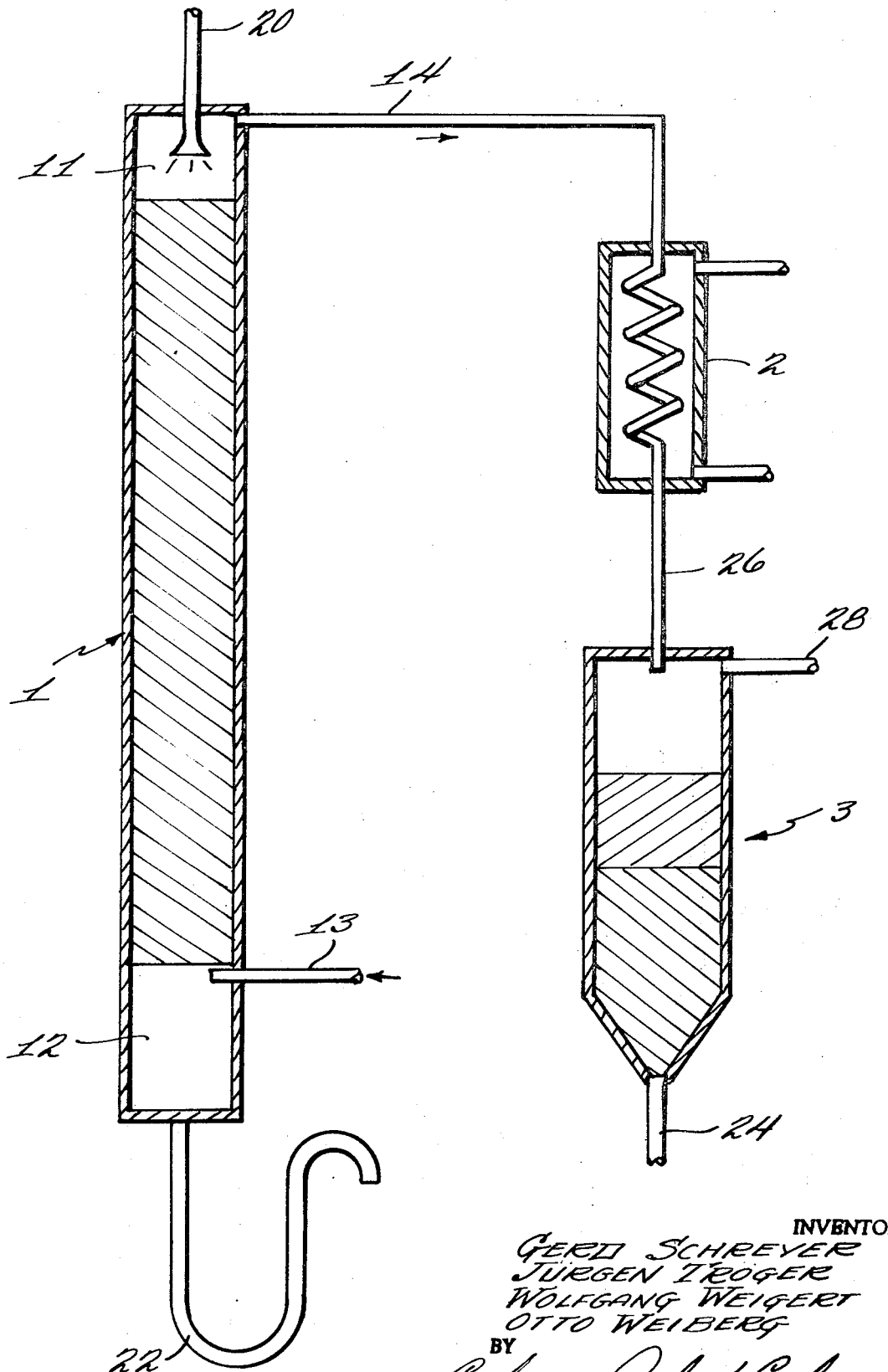

3,707,444
PROCESS FOR THE RECOVERY OF NONAQUEOUS HYDROGEN PEROXIDE
Gerd Schreyer, Gross-Auheim, Jurgen Troger, Wolfgang, Wolfgang Weigert, Offenbach am Main, and Otto Weiberg, Neu-Isenburg, Germany, assignors to Deutsche Gold- und Silber-Scheideanstalt vormals Roessler, Frankfurt am Main, Germany
Continuation-in-part of abandoned application Ser. No. 856,070, Sept. 8, 1969. This application Oct. 8, 1970, Ser. No. 79,315
Claims priority, applications Austria, Sept. 16, 1968, A 9,025/68; Germany, Oct. 10, 1969, P 19 51 211.9
Int. Cl. B01d 3/34; C01b 15/07
U.S. Cl. 203—51  17 Claims

ABSTRACT OF THE DISCLOSURE

Anhydrous hydrogen peroxide solutions are prepared from a hydrogen peroxide containing working solution produced in the anthraquinone process after the oxidation step by employing a stripping distillation under reduced pressure using an organic solvent as the stripping agent.

---

This application is a continuation-in-part of application 856,070, filed Sept. 8, 1969 and now abandoned.

The present invention is concerned with a process for obtaining anhydrous hydrogen peroxide solutions.

In the production of hydrogen peroxide by the anthraquinone process, there is used a solution (called for short a working solution) of one or more alkyl anthraquinones in a high boiling solvent stable to oxygen and hydrogen peroxide. As alkyl anthraquinones, there are employed, for example, alkyl derivatives thereof, such as 2-methyl anthraquinone, 2-ethyl anthraquinone, 2-butyl anthraquinone, 2-isopropyl anthraquinone, 2-amyl anthraquinone, 2-sec. butyl anthraquinone, 2-t-butyl anthraquinone, 2-sec. amyl anthraquinone, 1,3-dimethyl anthraquinone, 2 - 3 - dimethyl anthraquinone, 1,4 - dimethyl anthraquinone, 2,7-dimethyl anthraquinone and mixtures of them as well as their partially nuclear hydrogenated derivates, e.g. the tetrahydro anthraquinones such as 2-ethyl tetrahydro anthraquinone. As solvents there have been used, among others, alkyl benzenes such as tetramethyl benzene, paraffins, higher alcohols, naphthalenes such as Tetralin (tetrahydronaphthalene), dimethyl naphthalene and esters such as methyl cyclohexyl acetate, trioctyl phosphate.

Any water insoluble oxygen and hydrogen peroxide stable solvent for the anthraquinone can be used. The solvent normally has a boiling point over 150° C.

The working solution is hydrogenated with the aid of hydrogenation catalysts such as, for example, palladium black, palladium-carrier-contact or Raney nickel whereby a more or less greater part of the anthraquinone is converted to the corresponding hydroquinone. After separation of the hydrogenation contact catalyst the hydroquinone containing working solution is gassed in the oxidation step with air, oxygen, or with oxygen enriched air. Thereby the anthrahydroquinone is again oxidized to the anthraquinone whereby hydrogen peroxide is formed as a by-product in the solution.

In the customary extraction step following the oxidation, the hydrogen peroxide is extracted and is present then as an aqueous solution.

After drying, the working solution is again introduced into the hydrogenation step and the cycle begins anew. At different places in the cycle regeneration or purification steps can be introduced in order to regenerate or to remove troublesome decomposition products which likewise arise.

In case the hydrogen peroxide is to be used in nonaqueous solution, for example, for oxidation, it must be transferred into an organic solvent from the aqueous solution obtained by extraction. For this purpose, cumbersome, expensive and tedious distillations are necessary to remove the water.

The invention is based on the problem of finding a process which avoids the disadvantages of the known processes of producing directly, solutions of hdyrogen peroxide in organic solvents.

According to the invention, this problem is solved by a process which consists in separating hydrogen peroxide from the hydrogen peroxide containing working solutions, which have been obtained in the hydrogen peroxide production by the anthraquinone process after the oxidation step, with the help of a stripping distillation under reduced pressure and the use of vapors of organic solvents having a boiling point up to about 160° C. as the stripping agent and after condensation as a nonaqueous solution recovering in the solvent used in the stripping. Advantageously at the same time a portion of the working solution carried away by the stripping, is separated in a phase separation vessel and returned to the cycle.

In contrast to the known methods of operation, there is obtained by this process directly solutions of hydrogen peroxide in the organic solvent used in the stripping.

Any of the conventional anthraquinones, alkyl anthraquinones and partially hydrogenated anthraquinones, including, but not limited to those set forth above, can be used to produce the working solution. Also there can be employed any of the high boiling solvents conventionally employed in making the working solution, including, but not limited to those set forth above.

The stripping distillation is preferably carried out at pressures between 5 and 60 torr and temperatures between 30 and 110° C., although pressure of 3 to 100 torr and temperatures of 20 to 120° C. and be used.

For stripping there are best suited vapors of substances which dissolve hydrogen peroxide and are not attacked by hydrogen peroxide under the process conditions. For these materials, depending on the later intended use, carboxylic acids, esters, alcohols and ethers having 4 to 10, preferably 4 to 8 carbon atoms, ketones having 3 to 7 carbon atoms, have proven suitable. Thus, there can be used carboxylic acids such as formic acid, acetic acid, propionic acid, butyric acid, isobutyric acid, pivalic acid, esters such as ethyl acetate, propyl acetate, butyl acetate, allylacetate, propyl formate, butyl formate, isobutyl acetate, t-butyl acetate, amyl acetate, isoamyl acetate, methyl propionate, ethyl propionate, methyl butyrate, ethyl butyrate, methyl valerate, methyl isovalerate, isopropyl acetate, 2-ethylbutyl acetate, sec-hexyl acetate, propyl propionate, isopropyl propionate, butyl propionate, isobutyl propionate, amyl propionate, propyl butyrate, isobutyl butyrate, methyl isobutyrate, ethyl isobutyrate, propyl isobutyrate, isopropyl isobutyrate, isobutyl isobutyrate, amyl isobutyrate, ethyl valerate, methyl isovalerate, propyl isovalerate, methyl caproate, alcohols such as propanol, butanol, isobutyl alcohol, amyl alcohol, hexyl alcohol, cyclohexanol.

An especially preferred class of stripping agents are esters of acids of the formula

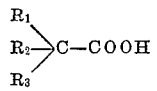

where $R_1$, $R_2$, and $R_3$ are lower alkyl, i.e. $R_1$ are alkyls with 1 to 4 carbon atoms and $R_2$ and $R_3$ alkyls with 1 to 2 carbon atoms. Thus, there can be used esters of pivalic acid, 2,2-dimethylpentanoic acid, neodecanoic acid, neotridecanoic acid, 2,2,4,4-tetramethylvaleric acid.

Most preferred are lower alkyl esters of pivalic acid such as methyl pivalate, ethyl pivalate, propyl pivalate, isopropyl pivalate, butyl pivalate, sec. butyl pivalate, amyl pivalate and hexyl pivalate. There also can be used, for example, methyl neodecanoate, ethyl neodecanoate, methyl neotridecanoate.

Particularly preferred are esters of aliphatic alcohols, especially methyl to butyl alcohols with acids where $R_1$ is an alkyl group with 1–3 carbon atoms and $R_2$ and $R_3$ are alkyls of 1 to 2 carbon atoms. Most preferred are methyl and butyl esters of pivalic acid (trimethyl acetic acid). In addition to the specific esters just mentioned there can be used, for example, the methyl ester of 2,2-dimethyl valeric acid and the ethyl ester of 2,2-diethyl butyric acid.

There also can be used allyl acetate as well as esters of cycloaliphatic alcohols such as cyclohexyl acetate, cyclohexyl butyrate, cyclohexyl pivalate, cyclohexyl formate, methyl cyclohexyl acetate and cyclopentyl acetate.

Additionally there can be used as stripping agents mixtures of carboxylic acids, esters, ketones or alcohols with aromatic or aliphatic hydrocarbons or hydrocarbon fractions boiling up to 160° C. A mixture which can be used is 60% acetic acid and 40% n-propyl ether.

Besides there can be used aliphatic ethers with 4–10 carbon atoms such as diethyl ether, diisopropyl ether, dibutyl ether, diisobutyl ether, di sec. butyl ether, diamyl ether, di-isoamyl ether, ethyl propyl ether, propyl butyl ether, ethylene glycol dimethyl ether, propylene glycol dimethyl ether, methyl ethyl ether of ethylene glycol, methyl ethyl ether of propylene glycol.

Also there can be used aliphatic ketones with 3–7 carbon atoms, for example acetone, methyl ethyl ketone, methyl isobutyl ketone, cyclohexanone, di-isopropyl ketone.

Additional examples of mixtures of stripping agents include, for example, acetic acid-di-n-propyl ether, acetic acid-methyl ethyl ethylene glycol ether, di-isopropyl ether-t-butyl acetate, di-isopropyl ether-t-butyl acetate-benzene, acetic acid-n-butyl acetate, acetone-benzene, propionic acid-propyl propionate, propyl acetate-acetic acid, propyl acetate-propanol. For example, in each of the two and three component mixtures just mentioned there can be used equal parts by volume of each component of the mixture.

The proportions in the mixture can vary within wide boundaries, i.e. from the pure components up to all proportions of the mixture. In most cases, however, on the grounds of safety it is desirable that the desorbed hydrogen peroxide be completely soluble in the mixture used for desorption so that two phases cannot form in which one can possess many of the hydrogen peroxide explosive forming properties. Such a phase separation in the condensate is primarily to be expected in the use of large amounts of hydrocarbons in the mixtures. In the mixtures with hydrocarbons, therefore, the other partner of the mixture should be present in an amount at least 20 weight percent.

If one is interested in further processing the organic hydrogen peroxide solution to peracids, then there is used as the stripping agent the corresponding base acid, thus for example, if peracetic acid is to be produced then acetic acid is used as the stripping agent.

In many cases in the stripping, the passing over also of a portion of the working solution can be avoided by use of a slight reflux in the stripping apparatus, which corresponds to about a reflux ratio (R:E) of 1.5 to 0.5.

In the stripping in the event a portion of the working solution passes over which is not miscible with the hydrogen peroxide containing stripping agent, the portion of the working solution can be isolated without difficulty from the hydrogen peroxide containing stripping agent by phase separation and returned to the recycling working solution. For example, this is the case in the use of acetic acid as the stripping agent. For example if the working solution consists of alkyl anthraquinone, trioctyl phosphate and alkyl benzenes the alkyl benzene passes over with the acetic acid and the hydrogen peroxide. This separates in the receiver from the solution of hydrogen peroxide in acetic acid so that by construction of the receiver as a phase separation vessel it is possible to isolate the alkyl benzene in simple fashion. An advantage thereof is that the alkyl-benzene contains only small amounts of hydrogen peroxide.

Unless otherwise indicated, all parts and percentages are by weight.

The single figure of the drawings is a schematic diagram of a suitable apparatus for carrying out the invention.

EXAMPLE 1

Referring to the drawing a recycling solution of 9.3 grams of hydrogen peroxide in a liter of a mixture of 272 ml. of trioctyl phosphate, 633 ml. of tetramethyl benzene and 120 grams of ethyl anthraquinone arising from the anthraquinone process was preheated to 70° C. and fed through line 20 to the head of 11 of a stripping column 1. The working solution flowed over the column and left it in the lowermost part 12 over a liquid cut off or trap 22. In the lower part of the column at 13 superheated acetic acid vapor at 100° C. was injected into the column operating under a pressure of 18 torr. The acetic acid stripping vapor left the head of the column by line 14 together with hydrogen peroxide and a small amount of tetramethyl benzene, was condensed in cooler 2 and then fed through line 26 to separator 3 and separated. 98% of the hydrogen peroxide fed to column 1 was found in separator 3, the rest in the discharging working solution at the sump 12 of the column. For each liter of working solution, there was injected 80 grams of acetic acid vapor at 13 of which 53 grams passed over with the distillate. The rest remained in the column discharge. In separator 3 there accumulated a solution of 14.7 weight percent $H_2O_2$ in acetic acid as a lower layer which was drawn off through line 24. At the same time, there separated per liter of working solution added 28 grams of tetramethylbenzene as an upper layer which was drawn off through line 28 and could be recycled to the working solution. Through heating of the sump the amount of acetic acid in the discharge 22 can be substantially reduced or completely removed.

The stripping agent desirably is immiscible with the portion of the working solution passing over with it in order that there can be a phase separation.

EXAMPLE 2

A working solution which consisted of 9 grams of hydrogen peroxide in a liter of a mixture of 68 grams of ethyl anthraquinone, 52 grams of tetrahydroethyl anthraquinone, 675 ml. of an eutectic mixture of diphenyl and diphenyl oxide and 225 ml. of trioctyl phosphate was fed at 62° C. to the head of a distillation column. The hydrogen peroxide was stripped by countercurrent contact with di-n-propyl ether below 30 torr and kept in a subsequent condenser as a 15% solution in the ether. The sump of the desorption column was heated to 138° C. and contained scarcely any hydrogen peroxide and di-n-propyl ether.

EXAMPLE 3

The same working solution as in Example 2 was stripped in the same manner with a mixture of 40% acetic acid and 60% di-n-propyl ether and as the distillate there was maintained a 17% solution of the hydrogen peroxide in the mixture.

EXAMPLE 4

In another example the working solution of Example 2 was stripped in the same manner with ethyl pivalate vapor. Ethyl pivalate was fed in vapor form in such an amount to the column operating below 25 torr than a distillate passed over the head at 40° C., which after condensation contained 17.9 weight percent hydrogen peroxide in ethyl pivalate. The sump of the distillation column was heated to 135° C. and was practically free of ethyl pivalate.

What is claimed is:
1. A process for the production of nonaqueous hydrogen peroxide solution comprising separating hydrogen peroxide from the hydrogen peroxide containing working solution of the anthraquinone process after the oxidation step by employing a stripping distillation under reduced pressure using as the stripping agent vapors of an organic solvent having a boiling point up to about 160° C. for the hydrogen peroxide, said organic solvent being selected from the group consisting of carboxylic acids, esters of carboxylic acids, alcohols, aliphatic ethers having 4 to 10 carbon atoms and aliphatic ketones having 3 to 7 carbon atoms, and then condensing the stripping agent vapors containing hydrogen peroxide to form a nonaqueous solution of hydrogen peroxide in the organic solvent employed as a stripping agent.

2. A process according to claim 1 wherein a portion of the working solution immiscible with the stripping agent is passed over with the stripping agent separated therefrom in a phase separation vessel and returned to the recycling working solution.

3. A process according to claim 1 wherein the stripping distillation is carried out at a pressure between 5 and 60 torr and a temperature between 30 and 110° C.

4. A process according to claim 1 wherein the stripping agent is a chemically stable solvent under the process conditions.

5. A process according to claim 4 wherein the solvent is selected from the group consisting of carboxylic acids, esters of carboxylic acids and alcohols.

6. A process according to claim 4 wherein the solvent is selected from the group consisting of aliphatic ethers having 4 to 10 carbon atoms and aliphatic ketones having 3 to 7 carbon atoms.

7. A process according to claim 5 wherein the stripping agent is a mixture of a carboxylic acid ester with either a carboxylic acid or alcohol or ether or ketone.

8. A process according to claim 5 wherein the solvent is selected from the group consisting of formic acid, acetic acid, propionic acid, their hydrocarbyl esters and alkanols.

9. A process according to claim 5 wherein the solvent is the ester of an acid having the formula

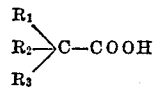

where $R_1$, $R_2$ and $R_3$ are lower alkyl.

10. A process according to claim 8 wherein the ester is a 1 to 4 carbon alkyl ester of pivalic acid.

11. A process according to claim 6 wherein the solvent is selected from the group consisting of diethylether, ethylpropylether, ethylene glycol dimethylether, acetone, methyl ethyl ketone and methyl isobutyl ketone.

12. A process according to claim 1 carried out in a stripping apparatus wherein a reflux ratio of 1.5 to 0.5 is maintained in the stripping apparatus to avoid the passing over of a portion of the working solution with the stripping agent.

13. A process according to claim 5 wherein the stripping agent is a mixture of a carboxylic acid with either a carboxylic acid ester, alcohol, ether or ketone.

14. A process according to claim 5 wherein the solvent is allyl acetate.

15. A process according to claim 6 wherein the solvent is selected from the group consisting of dipropyl ether, dibutyl ether, diisobutyl ether, di sec. butyl ether, diamyl ether, diisoamyl ether, methyl ethyl ether of ethylene glycol and methyl ethyl ether of propylene glycol.

16. A process according to claim 6 wherein the solvent is cyclohexanone.

17. A process according to claim 1 wherein there is used as the stripping agent a mixture of either (1) a plurality of members of the group consisting of allyl acetate, an alkyl ester of a fatty acid having the formula

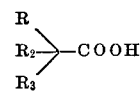

where $R_1$ is alkyl of 1–3 carbon atoms and $R_2$ and $R_3$ are alkyl groups of 1 to 2 carbon atoms, alkyl ethers of 4–10 carbon atoms and alkyl ketones of 3–7 carbon atoms, or (2) a mixture of at least one member of said group (1) with up to 80% of a hydrocarbon boiling up to 160° C.

References Cited
UNITED STATES PATENTS

| | | | |
|---|---|---|---|
| 3,321,279 | 5/1967 | Williams | 23—207 |
| 3,074,782 | 1/1963 | Meeker et al. | 23—207 |
| 2,859,155 | 11/1958 | Cichelli et al. | 23—207 |
| 2,909,532 | 10/1959 | Cosby et al. | 23—207 |
| 3,063,857 | 11/1962 | Schatz et al. | 203—60 |
| 3,259,555 | 7/1966 | Lankton et al. | 203—60 |

WILBUR L. BASCOMB, JR., Primary Examiner

U.S. Cl. X.R.

203—56, 60, 61, 62, 63, 64; 23—207